United States Patent Office 3,469,965
Patented Sept. 30, 1969

3,469,965
TREATING HARVESTED PLANT MATERIALS
WITH UREA DERIVATIVES
Michael Ian Bruce, John A. Zwar, and Noel Price
Kefford, all of 314 Albert St., East Melbourne,
Victoria, Australia
No Drawing. Filed Feb. 16, 1966, Ser. No. 527,777
Claims priority, application Great Britain, Feb. 18, 1965,
7,009/65
Int. Cl. A01n 3/00, 9/20
U.S. Cl. 71—68        4 Claims

ABSTRACT OF THE DISCLOSURE

Treatment of harvested plant materials to improve their storage characteristics which comprises treating the plant material with a preserving effective amount of a urea derivative of the formula:

R.NH.CO.NH.R' where R is selected from the group consisting of substituted phenyl and, heterocyclic aromatic groups and R' is selected from the group consisting of hydrogen, phenyl and substituted phenyl groups.

---

The present invention relates to a process for the preservation of the appearance and/or edibility of plant materials.

It has been found that by the treatment of plant materials with urea derivatives it is possible to preserve their appearance and edibility (where appropriate) for a significantly longer period than normal.

Accordingly the present invention is for a process for the treatment of plant materials with a urea derivative of the formula: R.NH.CO.NH.R' where R is aryl (for example phenyl or naphthyl) substituted aryl (for example substituted by halogen, nitro, alkyl or substituted alkyl, such as 3,4-dichlorophenyl, 3-nitrophenyl, 3-fluorophenyl, 4-cyanomethylphenyl or 3-methylphenyl), or a heterocyclic (for example beta-pyridyl, gammapyridyl, 4-pyrimidyl or quinolyl) or a substituted heterocyclic aromatic group (for example substituted by halogen, alkyl or nitro) group, and R' is hydrogen, alkyl (for example methyl, ethyl or amyl), substituted alkyl (for example substituted by halogen, alkoxy, carbalkoxy or aryl), cycloalkyl (for example cyclopropyl or cyclohexyl) substituted cycloalkyl (for example substituted by halogen or aryl), aryl (for example phenyl or naphthyl), substituted aryl (for example substituted by halogen, nitro, alkyl or substituted alkyl such as 3,4-dichlorophenyl, 3-nitrophenyl, 3-fluorophenyl, 4-cyanomethylphenyl or 3-methylphenyl) or a heterocyclic aromatic (for example beta-pyridyl, gammapyridyl, 4-pyrimidyl or quinolyl) or a substituted heterocyclic aromatic (for example substituted by halogen, alkyl or nitro) group.

According to a specially preferred embodiment of the invention, there is used a urea derivative of the formula: R.NH.CO.NH.R' wherein R is selected from substituted phenyl and heterocyclic aromatic groups and R' is selected from hydrogen, phenyl and substituted phenyl groups.

Examples of the urea derivatives which may be used in the process of the invention include N-3,4-dichlorophenyl urea,
N-3-bromophenyl-N'-phenylurea,
N-4-bromophenyl-N'-phenylurea,
N-4-acetaminophenyl-N'-phenylurea,
N-3-chloro-4-methylphenyl-N'-phenylurea,
N-4-chlorophenylurea,
N-3-fluorophenyl-N'-phenylurea,
N-3-fluorophenyl-N'-3-methylphenylurea,
N-3-fluorophenyl-N'-4-methylphenylurea,
N-4-pyridyl-N'-phenylurea,
N-4-cyanomethylphenyl-N'-phenylurea, and
N-5-quinolyl-N'-phenylurea.

The plant materials treated in accordance with the present invention include green vegetables, such as lettuce, cabbage, spinach, peas, beans, etc.; fleshy vegetables such as tomatoes, cucumbers, peppers, asparagus, etc.; flowers, such as daffodils, narcissus, carnations, roses, chrysanthemums, etc.; ornamental foliage such as evergreens; fruits such as peaches, plums, strawberries, etc.; root vegetables such as potatoes.

In modern marketing and transport conditions, plant materials are normally stored and transported under conditions of high humidity and in the dark; the present invention provides a method for the preservation of plant materials under such conditions.

The plant materials treated in accordance with the present invention may be treated with the urea derivatives before or after cutting or harvesting. It is usually more convenient to carry out such treatment immediately prior to cutting or harvesting.

The treatment according to the present invention is effected by spraying the plant materials with a aqueous solution or suspension of the urea derivatives. Additives present in the spray solution should be acceptable in foodstuff where edible plant materials are treated.

The urea derivatives may be formulated with wetting agents or in organic solvents, suitably containing wetting agents, so as to produce dispersable products. The wetting agent desirably is non-toxic and may comprise for example glyceryl or sorbitan mono-oleate or mono-stearate, condensation products of ethylene oxide with fatty acids, alcohols or phenols, or sodium sulphonate of dioctyl succinic acid. The urea derivatives may also be formulated with diluents.

The rate of application of the urea derivatives may vary over a wide range, and is in any event of a very small magnitude. The amount of urea derivative used should, of course, be sufficient to effectively preserve said plant material. The plant materials are suitably treated with an aqueous solution containing about 1–100 parts per million of the urea derivative.

The following examples are given to illustrate the present invention. The parts and percentages are by weight unless otherwise indicated.

EXAMPLE 1

Lettuce and cabbage heads, immediately before cutting, were sprayed with an aqueous solution containing the urea derivative indicated in the column 1 of the table below in amount indicated in column 2 of the table as parts per million (p.p.m.). The lettuce and cabbage heads were then stored in polythene-lined boxes for 5 days at 60° F. At the end of this time the vegetables were examined and an assay made of the number of leaves per head which had to be discarded due to distasteful appearance (viz, slimy, flaccid or extensively discoloured). This number is given in the following Table I.

TABLE I

| Column 1 | Column 2 | Column 3 | Column 4 |
|---|---|---|---|
| Compound | Concentration, p.p.m. | Lettuce | Cabbage |
| Untreated control | | 10 | 6 |
| N-3-fluorophenyl-N'-phenyl urea. | 10 | 8 | 4 |
| | 30 | 5 | 2 |
| | 100 | 2 | 0 |
| N-4-acetamino phenyl-N'-phenyl urea. | 5 | 8 | 3 |
| | 20 | 2 | 0 |
| 3,4-dichlorophenyl urea | 5 | 9 | 4 |
| | 20 | 4 | 1 |
| | 100 | 2 | 0 |

EXAMPLE 2

Narcissi with leaves, freshly picker, were sprayed with an aqueous solution containing the urea derivative indicated in column 1 of the table below in amount indicated in column 2 of the table as parts per million (p.p.m.). The plant materials were then stored in polythene-lined boxes for 5 days at 60° F. At the end of this time the plants were examined and an assay made of the proportion of leaves discarded due to distasteful appearance (viz. slimy, flaccid or extensively discoloured). This percentage is given in the following Table II.

TABLE II

| Column 1 | Column 2 | Column 3 |
|---|---|---|
| Compound | Concentration, p.p.m. | Leaves discarded, percent |
| Untreated control | | 55 |
| N-3-fluorophenyl-N'-phenyl urea | 10 | 43 |
| | 30 | 20 |
| | 100 | 0 |
| N-4-acetaminophenyl-N'-phenyl urea | 5 | 40 |
| | 20 | 0 |
| 3,4-dichlorophenyl urea | 5 | 42 |
| | 20 | 10 |
| | 100 | 0 |

EXAMPLE 3

Whole cut leaves of ordinary carrot were dipped in water containing 0.25% of the wetting agent Tween 20 or in aqueous solutions of various concentrations of 3,4-dichlorophenyl urea indicated below, also containing 0.25% of the wetting agent Tween 20. The leaves were taken 6 at a time, and in replicates. The leaves were stored in ventilated polythene bags at 25° C. for 8 days. At the end of this time the leaves were assayed for colour changes, and scored on the basis of 5 for the original green colour and 0 for a completely yellow leaf.

The following results were obtained:

Control _____ 2.7
10 parts per million _____ 3.6
100 parts per million _____ 4.2

EXAMPLE 4

Single leaves of silver beet were dipped either in water containing 0.25% of the wetting agent Tween 20 or in an aqueous solution containing 0.25% of Tween 20 and 100 parts per million of 3,4-dichlorophenyl urea. The carbon dioxide production from the leaves was then followed at 25° C., and the respiration associated with yellowing was clearly retarded with the leaves treated with 3,4-dichlorophenyl urea. The time at which respiration commences rather suddenly to rise corresponding with marked decomposition was 4 days for the control and 7 days for the leaves dipped in 3,4-dichlorophenyl urea.

EXAMPLE 5

Batches of freshly picked Brussels sprouts (about 30) were placed in mutton cloth bags and dipped for 10 minutes in solutions of N-(3,4-dichlorophenyl)-urea at concentrations of $10^{-4}$, $10^{-5}$, and $10^{-6}$ molar which also contained 500 parts per million of the alkyl phenol ethylene oxide condensation product known as Lissapol NX. After draining, the sprouts, still in the bags, were dried and kept in the dark at 20° C. At intervals of 1, 3 and 8 days after treatment three sprouts were taken from each bag and the chlorophyll extrated from 8 grams of the outside leaves, using 85% aqueous ethanol. The greenness of the chlorophyll extracts was determined, by measuring the optical density at 6650 A. on a spectrophotometer. Results are as follows:

| Concentration of 3,4-dichlorophenyl urea | Number of days after treatment | | |
|---|---|---|---|
| | 1 | 3 | 8 |
| $10^{-4}$ M | (¹) | 1.0 | 0.7 |
| $10^{-5}$ M | 0.6 | (¹) | 0.4 |
| $10^{-6}$ M | 0.8 | 0.6 | 0.5 |
| Untreated control (for comparison) | 0.7 | 0.5 | 0.2 |

¹ Debris in the sprout extracts interfered with spectrophotometer reading.

13 days after the sprouts had been treated, the remaining sprouts were examined visually and the percentage remaining green as opposed to yellow or mouldy was as follows:

Treatment at— Percent
$10^{-4}$ M _____ 60
$10^{-5}$ M _____ 30
$10^{-6}$ M _____ 20
Untreated controls _____ 10

We claim:
1. A process for the treatment of harvested plant materials to improve their storage characteristics which comprises treating the plant material with a preserving effective amount of a urea derivative of the formula:

R.NH.CO.NH.R' where R is selected from the group consisting of substituted phenyl and heterocyclic aromatic groups and R' is selected from the group consisting of hydrogen, phenyl and substituted phenyl groups.

2. A process as claimed in claim 1 wherein the urea derivative is one of the compounds
N-3,4-dichlorophenylurea,
N-3-bromophenyl-N'-phenylurea,
N-4-bromophenyl-N'-phenylurea,
N-4-acetaminophenyl-N'-phenylurea,
N-3-chloro-4-methylphenyl-N'-phenylurea,
N-4-chlorophenylurea,
N-3-fluorophenyl-N'-phenylurea,
N-3-fluorophenyl-N'-3-methylphenylurea,
N-3-fluorophenyl-N'-4-methylphenylurea,
N-4-pyridyl-N'-phenylurea,
N-4-cyanomethylphenyl-N'-phenylurea, and
N-5-quinolyl-N'-phenylurea.

3. A process as claimed in claim 1 wherein the plant material is treated immediately before harvesting.

4. A process for the treatment of harvested plant materials to improve their storage characteristics which comprises treating the plant material with a urea derivative of the formula:

R.NH.CO.NH.R' where R is selected from the group consisting of phenyl and heterocyclic aromatic groups and R' is selected from the group consisting of hydrogen, phenyl and substituted phenyl groups, said plant materials being treated with an aqueous solution containing about 1–100 parts per million of the urea derivative.

References Cited

Beaver et al.: Chemical Abstracts, "The Preparation and Bacteriostatic Activity of Substituted Ureas," vol. F9, pp. 1236–1245.

A. LOUIS MONACELL, Primary Examiner

J. M. HUNTER, Assistant Examiner

U.S. Cl. X.R.
99—154; 424—258, 263, 322